Nov. 11, 1969  M. HAWERKAMP  3,477,891
METHOD OF MAKING CONTINUOUS CORRUGATED PLASTIC PIPE
Filed Dec. 28, 1965  2 Sheets-Sheet 1

MANFRED HAWERKAMP
INVENTOR.

BY
Karl F. Ross
Attorney

Nov. 11, 1969     M. HAWERKAMP     3,477,891
METHOD OF MAKING CONTINUOUS CORRUGATED PLASTIC PIPE
Filed Dec. 28, 1965     2 Sheets-Sheet 2

MANFRED HAWERKAMP
*INVENTOR.*

BY Karl G. Ross
*Attorney*

United States Patent Office 3,477,891
Patented Nov. 11, 1969

3,477,891
METHOD OF MAKING CONTINUOUS
CORRUGATED PLASTIC PIPE
Manfred Hawerkamp, Altenrather Str. 47,
Troisdorf, Germany
Filed Dec. 28, 1965, Ser. No. 516,839
Claims priority, application Germany, Dec. 3, 1964,
H 54,730
Int. Cl. B31c 3/00; B65h 81/00; B32b 31/00
U.S. Cl. 156—143                           6 Claims

ABSTRACT OF THE DISCLOSURE

A method of making continuous corrugated plastic pipe wherein a continuous band of synthetic resin is wound simultaneously with a profiling core member whose width is a small fraction of the width of the band, upon a smooth-surface cylindrical mandrel so that adjoining turns of the band have their longitudinal edges in abutting relationship. The band is heated and compressed about the core member by a roller with a profiled periphery corresponding to the corrugations.

My present invention relates to a method of making tubular bodies (such as pipes and containers) from thermoplastic materials and to as well as improved tubular bodies resulting from this method; more particularly, this invention relates to the formation of tubular bodies whose circumferential or peripheral extent is substantially larger than the width of the material used in making such bodies.

The manufacture of tubular bodies for use as pipes, containers and the like has been carried out in many ways. For example, longitudinal-seam bodies can be produced by welding or otherwise joining opposite longitudinal ends of an elongated band bent around a mandrel whereby the resulting seam extends generally parallel to the axis of the body. Seamless methods of manufacture also have been proposed for metal and nonmetallic pipes and containers, the latter method generally involving centrifugal molding, casting or the like. More recently, however, it has been suggested to form so-called "spiral-seam" bodies by helically winding a band of material about an axis within a tubular guide or upon a mandrel by feeding the band against the mandrel or guide and at an angle thereto in the direction of the advance of the tubular body so that longitudinal edges of the band abut or overlap earlier turns thereof and are joined thereto to form a tubular body whose circumferential periphery is substantially in excess of the width of this band. When metallic pipes are to be provided, the turns of the band are joined by welding, soldering or the like and it has been proposed to produce such pipes from thermoplastic synthetic resins whereby the turns of the band are joined by thermal bonding or the like. This method has the advantage that not only relatively large tubes or containers can be produced, but the process can be carried out substantially continuously to form tubes and containers of any desired length.

It is the principal object of the present invention to provide an improved method of forming spiral-seam bodies, such as containers or pipes, by which the resulting tubular bodies will have greater strength than has been possible heretofore.

Another object of this invention is to provide an improved, relatively high-strength tubular body composed of thermoplastic synthetic resin.

These objects and others, which will become apparent hereinafter, are attained in accordance with the present invention by a method of forming the hollow-tubular bodies from a thermoplastic band which comprises the steps of winding a plastically deformable thermoplastic band upon a mandrel in helical configuration whereby the longitudinal edges of the band at successive turns of the winding are brought into engagement and joined, the mandrel being provided with at least one profiling formation extending around its periphery and underlying the band wound upon this mandrel, the band being pressed onto said mandrel to deform the turns of the band in accordance with the configuration of the profiling formation. According to a specific feature of this invention, the profiling formation is annular or helicoidal and the mandrel is rotated with a peripheral speed substantially equal to the rate at which the band is wound thereon with the band being pressed against the profiling formation by a roller shaped complementarily to the profile of the mandrel. The profiling formation of the manrel can, in accordance with one embodiment of this invention, be fixed with respect to the mandrel; in this case, the profiling formation is preferentially generally helicoidal so that the completed tube, container or other hollow body can be withdrawn from the mandrel by unscrewing it relative thereto. When, however, the profiling formations are circular and fixed to the mandrel so ts to form annular flanges in the finished hollow body or annular recesses therein, it may be necessary to longitudinally split the hollow body and reseal it after withdrawing it from the mandrel.

In accordance with a preferred embodiment of this invention, however, the profiling formation or formations are movable axially with respect to the mandrel which can then have a substantially smooth cylindrical surface or other configuration in conformity with the outline of the body to be produced. Thus, the profiling formation can be an elongated flexible core member, of a width less than that of the band, wound upon the mandrel prior to or concurrently with applications of the thermoplastic band thereto, the thermoplastic band being forced over this core member to impart its configuration to the finished tube or other hollow body. It is particularly advantageous when the elongated core member is fed against the mandrel below the thermoplastic band substantially at the point at which this band is fed helically against the mandrel as mentioned above. Alternatively, rings, which are like the core member continuously wound about the mandrel and have a width less than that of the band, can be disposed in axially spaced relationship upon the mandrel to form respective core members. Furthermore, such rings can be formed in in situ by feeding individual core members cut to a length equal substantially to the circumference of the mandrel and thus the inner circumference of the tubular body to be formed, generally tangentially in a plane perpendicular to the axis of the mandrel rather than inclined forwardly with respect to this axis as is the case with helically wound core members and bands. In each case, the completed tubular body can be removed from the mandrel together with the respective core member or members and the latter can be removed or permitted to remain the respective channels of the tubular body as desired.

I have found that, when the core member is permitted to remain within the channel formed therearound in the tubular body after its removal from the mandrel, the core member serves as a reinforcing element which increases the strenght of the tube or container well beyond that resulting merely from the corrugations or ribs produced by the deformation of the thermoplastic material around the core member or profiling formation. When the core member is permitted to remain in the respective channel, it is preferred that the core members have smooth inner surfaces adapted to lie along an imaginary cylinder corresponding to the cylindrical surface of the interior of the body thus produced, the core members completely filling the respective channel so that a subtantially smooth inner wall is provided for the container. The core members may thus be of semicylindrical or of polygonal cross-section with the flat side of the respective member lying against the surface of the mandrel. Inasmuch as the thermoplastic band is applied in a plastically deformable (i.e. warm) state, it is possible to thermally bond the synthetic resin to the core member so that the latter cannot be removed from its respective channel and is held therein by a strong adhesive force. The bonding of the thermoplastic band to the core member is augmented by the additional application of heat at the point at which the band is applied to the mandrel. The pressure of the contouring roller at this point increases still further this bond.

According to a further feature of this invention, the plastically deformable band of synthetic resin is applied to the mandrel and formed around the profiling formation upon extrusion from a conventional extrusion press without substantial hardening of the band. In this case, additional heating of the band is not required although, in some instances, it may be found to be advantageous. The profiling formations, whether fixed to the mandrel or movable relatively thereto, preferably have a height substantially equal to the thickness of the thermoplastic band, thereby producing a rib or corrugations in the tubular body of corresponding height. This has been found to be highly desirable although it is not absolutely essential. The turns of the helically wound band can be thermally bonded together in abutting relationship and/or with overlapping and it may be noted in this connection that particularly satisfactory spiral or helical scenes are obtained when the adjoining edges of the band are beveled complementarily so that a partial overlapping without increase in the wall thickness of the body can be obtained.

The method of the present invention has the substantial advantage that the tubular bodies (e.g. pipes or containers) produced thereby have a greater strength than similar bodies without the helical or annular ribs, especially when the core members are retained as fillers in the respective channels. Even without such fillers, however, the stability of the containers or pipes is found to be a substantial improvement over prior tubular bodies of similar outlines. The tubular bodies can be used as extension members or axially compressible members in pipe systems or the like because of the corrugated configuration thereof when the core members are removed.

The above and other objects, features and advantages of the present invention will become more readily apparent from the following description, reference being made to the accompanying drawing in which.

Figure 1:
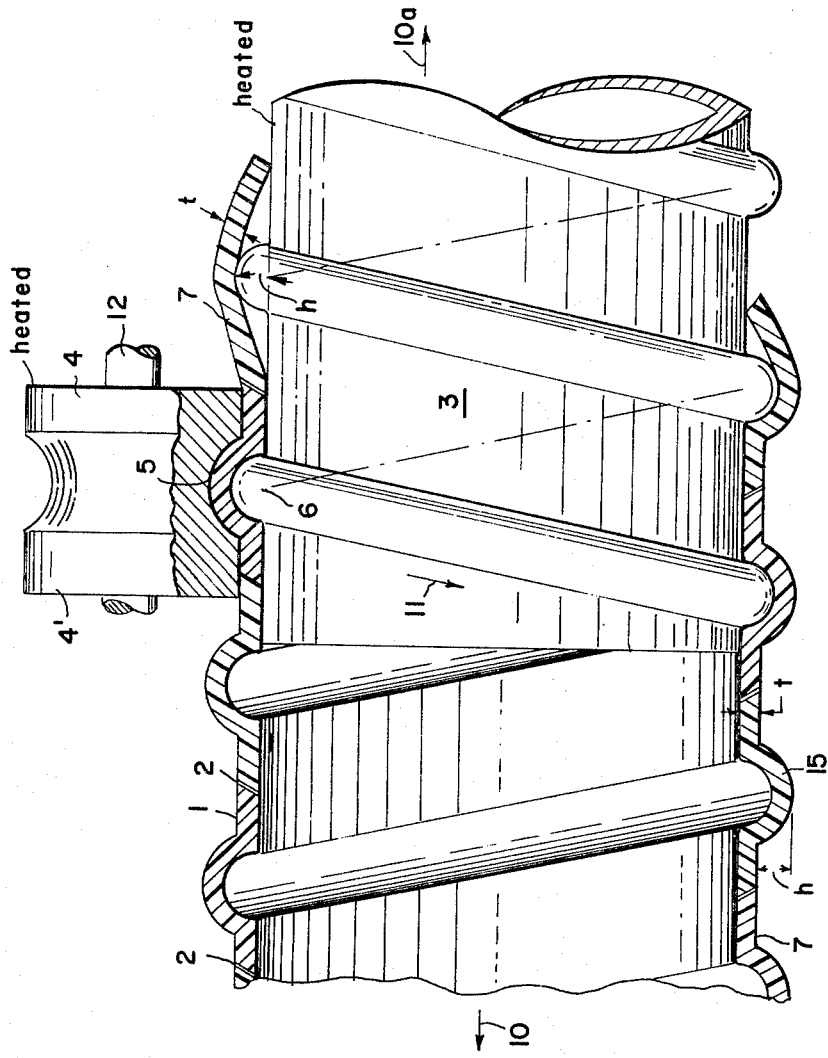
FIG. 1 is an axial cross-section view of an apparatus for producing a helical-seam thermoplastic tube in accordance with the method of this invention.

In FIG. 1, I show a system for producing helical-seam thermoplastic pipes in accordance with the present invention which comprises a generally cylindrical mandrel 3 whose periphery is formed with a helicoidal profiling formation 6 of semicylindrical configuration, the mandrel 3 being of the stationary type. The band 1 of deformable (i.e. heated) thermoplastic material is fed generally tangentially against the mandrel at an angle inclined to the axial plane of the mandrel corresponding to the plane of the paper in the direction of advance of the tube 7 (arrow 10) in the conventional manner used with helical-seam pipe and preferably with the aid of a compression roller 4 profiled at 5 complementary to the profile of the formation 6. The band 1 is fed relatively to the stationary mandrel 3 in the direction represented by arrow 11 and is formed around the profiled formation 6 by the compression roller 4 which is journaled on the shaft 12; the roller may be heated if the band 1 is insufficiently deformable. The band 1 can be composed of any thermoplastic synthetic resin and suitable resins for this purpose include polyvinyl chloride, polyethylene, polystyrene and like and copolymers. The oppositely beveled longitudinal edges of the band 1 are brought together to form a helical-seam 2 in which the beveled edges overlap slightly so that a cylindrical portion 4' of the roller 4 can apply the necessary pressure for bonding the successive turns together along the seam 2. The latter thus runs helicoidally within the completed tube 7 which continuously advances axially in the direction of arrow 10 with respect to the stationary mandrel 3 and thus threads itself off this mandrel. It is also possible to mount the roller 4 with freedom of axial movement upon its shaft 12 and rotate the mandrel 3a (FIG. 2) in the clockwise sense as illustrated in this figure. The mandrel and tube 7a thereby produced will move axially in a direction corresponding to that represented by arrow 10a in FIG. 1 when the profile formations are rigid with the mandrel as illustrated in the latter figure. When, however, the profiling formation is constituted by a core member 6a which is continuously fed to the mandrel 3a below the band 1a as the point at which the roller 4a, which is profiled at 5a complementarily with respect to the configuration of the core member 6a, the mandrel 3a can be rotated in a counterclockwise sense to smooth the inner surface of the tube 7a thus produced while preventing bonding of the thermoplastic or the core member thereto. When, however, the mandrel is rotated so that it shifts axially together with the tube as represented by the arrow 10a of FIG. 1, it is necessary upon discontinuance of the winding operation to unthread the mandrel from the tube. In a system of FIG. 2, as shown, however, the tube 7a pays off the mandrel 3a in a direction corresponding to arrow 10 of FIG. 1.

The band 1a and the band 1 can be in a plasically deformable state because of the fact that they are extruded from an extrusion press 13a and are applied to the respective mandrel without substantial cooling. Both the rollers and the mandrel can, of course, be heated when the band is in a cool state in order to render the band plastically deformable as it is applied to the mandrel. After cooling, the tube or container is removed from the mandrel. As can be seen in FIG. 1, the spiral or helical rib 15, formed into the tube 7 by the process of this invention, has a height $h$ equal substantially to the thickness $t$ of the thermoplastic band. The helical rib 15 here has the same pitch as the helical windings of the turns of the band forming the tube and thus of the seam 2 although the pitch of the profiling formation 6 can be different from that of the band and seam whereby the helical rib of the tube will cross the seam at spaced locations along the body.

Figure 2:
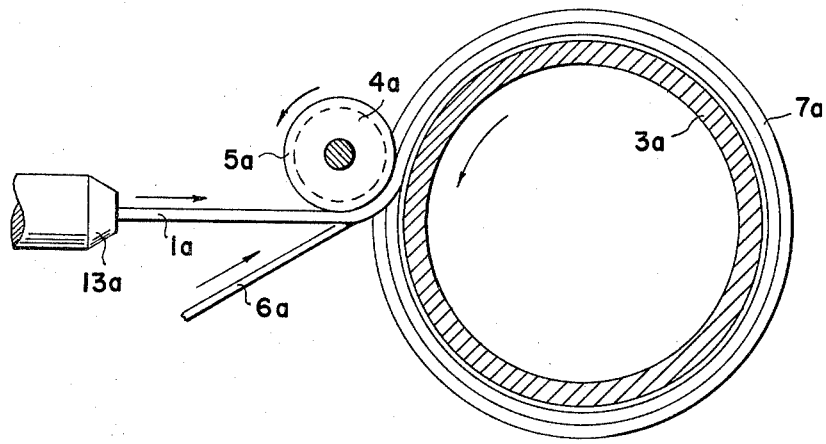
FIG. 2 is a view of a modified system taken in a plane perpendicular to the axis.
Figure 3:
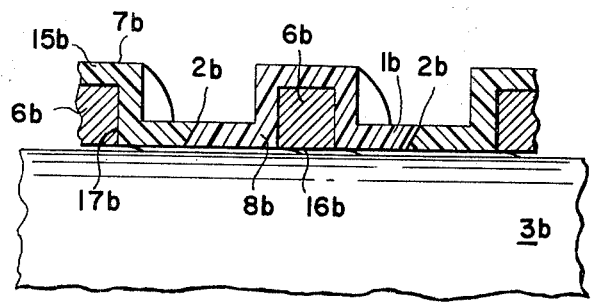
FIG. 3 is a detail view of the wall of still another tubular body prior to its removal from the mandrel.

From FIG. 3, it can be seen that the flexible core member 6b is wound onto the mandrel 3b concurrently with the synthetic-resin band 1b by a system similar to that shown in FIG. 2 whereby a roller shapes the flange-like or socket-like polygonal ribs 15b around the core member 16 concurrently with the application thereof and the band 1b to the mandrel 3b; the core member 6b is of polygonal cross-section with a flat surface 16b lying along a cylindrical surface defining the interior of the pipe 7b and thus along the surface of mandrel 3b.

Figure 4:
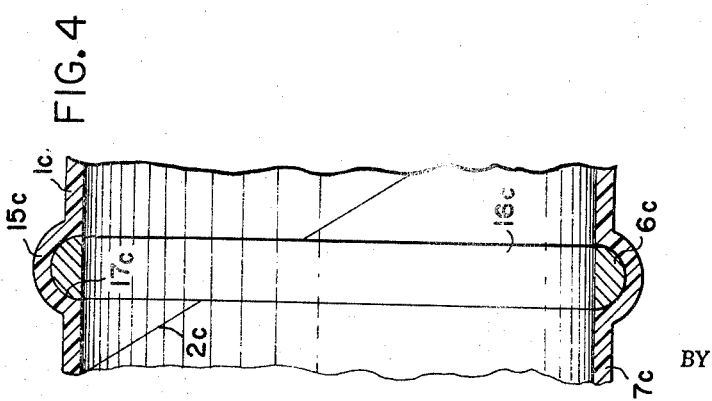
FIG. 4 is a fragmentary axial cross-sectional view of yet another tubular body made by the method of the present invention.

In FIG. 4, the core member 6c is shown to be generally toroidal, a succession of such rings being spaced axially along a cylindrical mandrel such as that shown at 3a or 3b. The roller for shaping the formations 15c about the core member 6c is moved radially into engagement with the band whose helical seam is shown at 2c at intervals determined by the spacing between the rings 6c.

The rollers can be axially shiftable along the respective shafts so that the continuous winding of the spiral band 1c need not be interrupted. Here, too, a flat surface (in cross-section) is provided at 16c for each ring to enable the resulting tubular body to be withdrawn from the smooth-surfaced mandrel. In the system of FIGS. 3 and 4, the core members 6b and 6c substantially fill the channels 17b and 17c of the respective ribs and are thermally bonded to the synthetic-resin material so as to constitute reinforcing elements. The core members may be removed, if desired, after cooling of the body by axial splitting of the tube 7c (FIG. 4) or by unwinding the spiral member 6b from the tube 7b (FIG. 3). When the core member is an annular body, transverse flanges such as that shown at 8b (FIG. 3) can be formed on the tubular body and can define a socket thereon.

I claim:
1. A method of making hollow bodies which comprises the steps of:
simultaneously winding a band of a plastically deformable thermoplastic synthetic resin in successive laterally abutting turns and a profiling core member underneath the band and with spaced turns but with substantially the same pitch angle upon a smooth-surfaced nonprofiled mandrel, said band having a width exceeding that of the profiling core member, and thermally bonding together the laterally abutting longitudinal edges of said band along said successive turns whereby said turns form a body overlying said profiling core member; and
rollingly pressing said plastically deformable band in a plastic state thereof around said formation to product a rib in the body formed by said turns.
2. The method defined in claim 1 wherein said band is heated during the winding thereof about said mandrel.
3. The method defined in claim 1 wherein said band is extruded in a plastically deformable state and is wound about said mandrel prior to rigidification thereof.
4. The method defined in claim 1 wherein said mandrel has a smooth cylindrical surface and said core member has a convex outer surface and a flat surface adapted to lie along said smooth surface of said mandrel for defining with the inner surface of said windings a substantially smooth inner wall of said body, said bands hugging said core member and being thermally bonded thereto.
5. The method defined in claim 1 wherein the laterally abutting edges of said band are complementarily beveled and are heat bonded together in overlapping relationship.
6. The method as defined in claim 5 wherein said band is heated to bond it to said core member.

References Cited

UNITED STATES PATENTS

| | | | |
|---|---|---|---|
| 3,240,645 | 3/1966 | Friedwald et al | 156—143 XR |
| 3,336,172 | 8/1967 | Hall et al. | 156—171 XR |
| 3,089,535 | 5/1963 | Vohrer et al. | 156—143 XR |
| 3,219,738 | 11/1965 | Olson | 156—244 XR |
| 3,222,728 | 12/1965 | Roberts et al. | 156—143 XR |
| 3,239,400 | 3/1966 | Anselm | 156—143 XR |
| 3,271,064 | 9/1966 | Hall | 156—244 XR |

FOREIGN PATENTS 814,962  6/1959  Great Britain.

EARL M. BERGERT, Primary Examiner

P. DIER, Assistant Examiner

U.S. Cl. X.R.

138—144, 173; 156—171, 173, 195, 196, 244, 443, 500, 582